March 18, 1952     F. KRAHULEC     2,589,401
TORQUE TESTING AND CALIBRATING DEVICE
Filed Feb. 21, 1947     2 SHEETS—SHEET 1
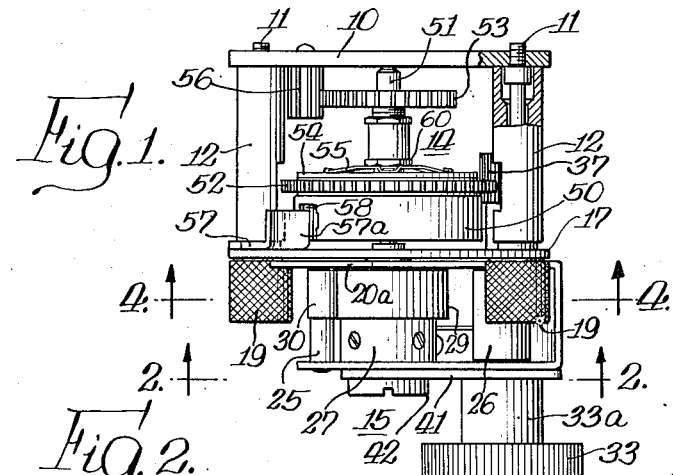
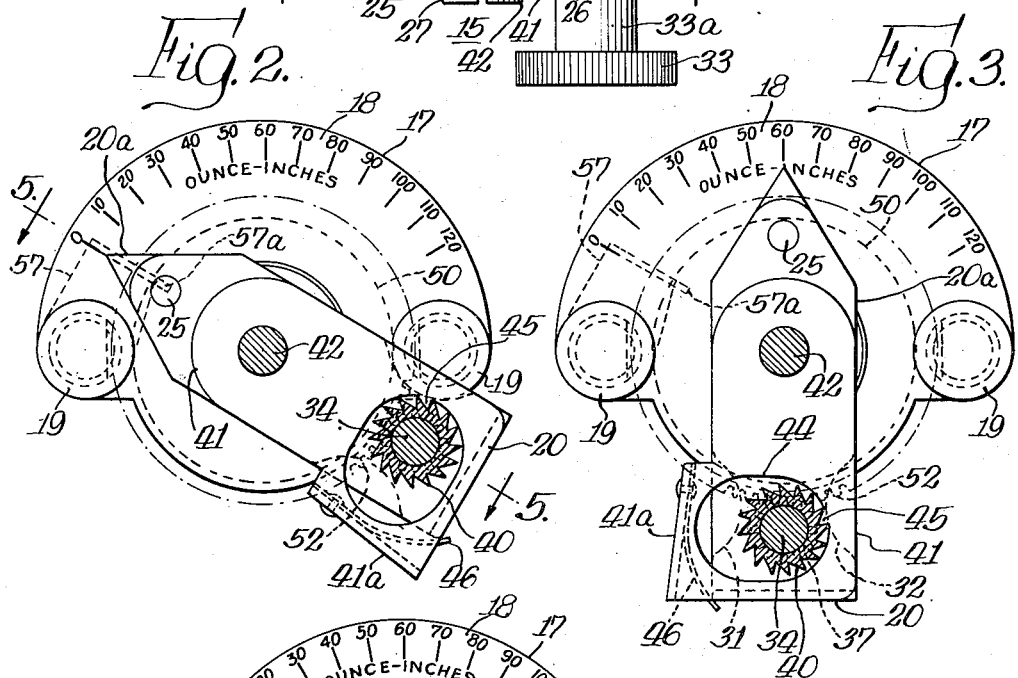
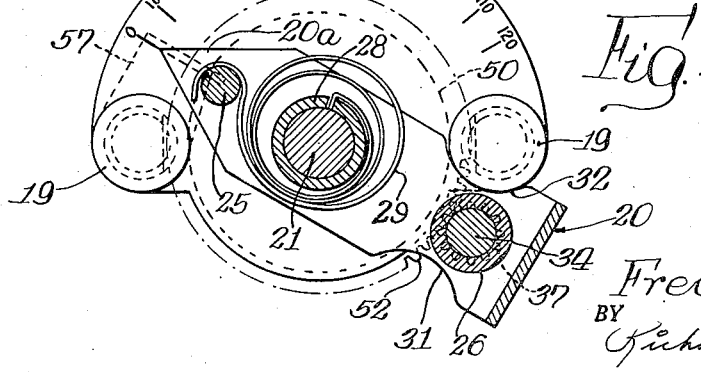
INVENTOR.
Fred Krahulec,
BY Richard D. Mason
Atty.

March 18, 1952  F. KRAHULEC  2,589,401
TORQUE TESTING AND CALIBRATING DEVICE
Filed Feb. 21, 1947  2 SHEETS—SHEET 2
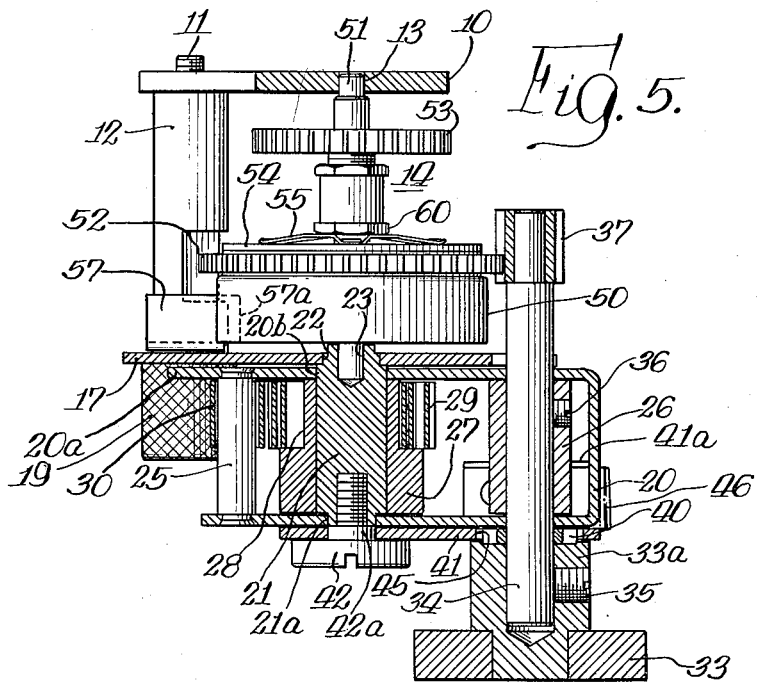
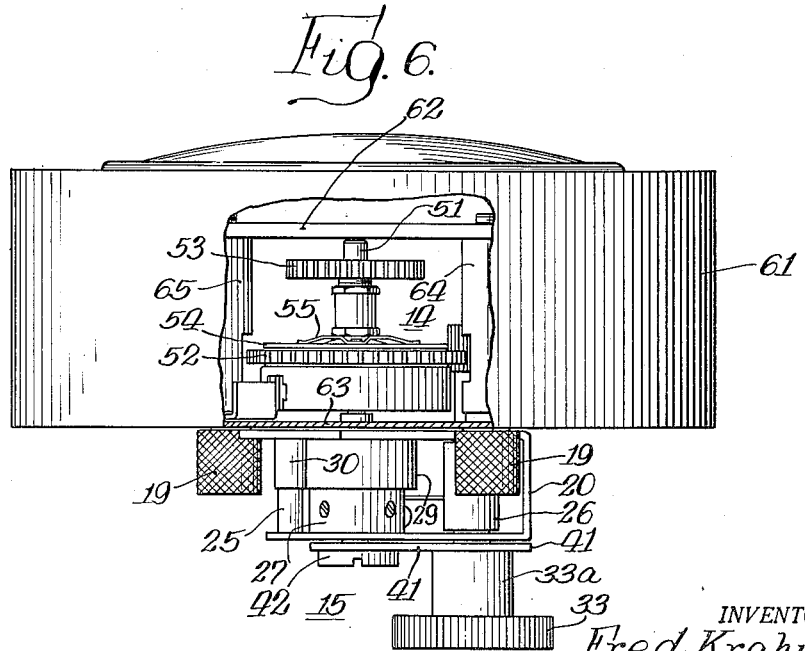
INVENTOR.
Fred Krahulec,
BY Richard D Mason
Atty.

Patented Mar. 18, 1952

2,589,401

UNITED STATES PATENT OFFICE 2,589,401

TORQUE TESTING AND CALIBRATING DEVICE

Fred Krahulec, Skokie, Ill., assignor to A. C. Nielsen Company, a corporation of Illinois Application February 21, 1947, Serial No. 730,143

7 Claims. (Cl. 73—139)

The present invention relates to a testing and calibrating device and more specifically to a torque meter particularly applicable for testing and calibrating clock spring and clutch assemblies.

There are many timing devices on the market today which include an electric clock device for controlling the timing cycle. In order to prevent the timing cycle from being affected in the event of an electric power failure, such devices are sometimes provided with an auxiliary spring powered clock mechanism which is rendered effective when the power failure occurs to continue the timing function so that when power is restored, the timing cycle can again be controlled by the electric clock means. Examples of such mechanisms are the off peak water heater controllers, program timers and the like. In connection with devices for recording the listening or viewing habits of wave signal receiver users, for example, such clock control apparatus is employed for producing motion of a recording tape. It is essential that the motion of the recording tape be continuous whether electric power failure occurs or not.

In all such devices, the spring controlled auxiliary clock is wound by electric means during the periods when the electric power supply is available. Since the periods of power failure are generally very short and rarely occur, it is obvious that the electric means for winding the spring for the auxiliary clock device generally maintains the spring fully wound and suitable means for rendering the winding means ineffective must be provided in order that the spring is not overwound and broken. For the purpose of preventing this undesirable result, the spring assembly for such auxiliary clock generally includes a friction clutch which slips whenever the torque applied to the spring exceeds a predetermined amount. It has been the general practice heretofore to manufacture such spring assemblies including the friction clutch on a production line basis without any means for calibrating the clutch to determine whether the slippage occurs at the proper time. Because of this, failures of the clock springs as by breakage of the anchorage points or the springs themselves occur by virtue of the winding mechanisms tending to wind the associated springs even though they are fully wound with the friction clutches not slipping as they properly should. Accordingly, it would be desirable to provide a testing or calibrating device such as a torque meter whereby the calibration of the clutches can readily be determined and adjusted to a desirable uniform torque so that the difficulty encountered heretofore can be eliminated.

In addition to calibrating the clutches of the clock spring and clutch assemblies, it is also desirable to calibrate the spring torque whereby it is possible to eliminate springs of too low a torque. When such a clock spring has been wound to a predetermined extent it should produce a predetermined amount of running time. If it does not do this, the information obtained from a device for recording the listening or viewing habits of wave signal receiver users will be useless in the event of a power failure and consequently it would be desirable to have a means of calibrating such springs to eliminate those which will provide unsatisfactory operation.

Accordingly, it is an object of the present invention to provide a testing device which will permit eliminating the difficulties enumerated above.

It is another object of the present invention to provide a new and improved torque meter for testing clock spring assemblies and calibrating the same.

It is a further object of the present invention to provide a torque meter for calibrating the friction clutches of clock spring assemblies which can readily be used either in connection with the clock unit without removing the spring assembly or which may also be used for calibrating such spring assemblies during the manufacture thereof on a production line basis.

It is another object of the present invention to provide a new and improved torque meter which is simple and compact, which can be used very readily by an unskilled operator, is inexpensive to manufacture and which will give many years of effective and satisfactory service.

Further objects and advantages of the present invention will become apparent as the following description proceeds and the features of novelty which characterize this invention will be pointed out with particularity in the claims annexed to and forming a part of this specification.

For a better understanding of the present invention, reference may be had to the accompanying drawings in which:

Fig. 1 is a top view of a torque meter embodying the present invention with a clock spring and clutch assembly in position for the testing operation;

Fig. 2 is a sectional view taken on line 2—2 of Fig. 1;

Fig. 3 is a view similar to Fig. 2 when the clutch is being calibrated with the torque meter indicating a predetermined torque applied to the spring and clutch assembly;

Fig. 4 is a sectional view taken on line 4—4 of Fig. 1;

Fig. 5 is a sectional view taken on line 5—5 of Fig. 2 assuming that Fig. 2 shows a complete device; and Fig. 6 is a view similar to Fig. 1 showing the torque meter applied to the spring and clutch assembly mounted within a clock device without removal of the spring and clutch assembly therefrom.

In order that the torque meter of the present invention may be used equally well to calibrate clock spring and clutch assemblies mounted within the clock itself without removing the spring and clutch assembly therefrom and also to test the spring and clutch assemblies during the manufacturing operation for example prior to assembling in the clock device itself, the torque meter of the present invention, as illustrated in Figs. 1 to 5 of the drawings, is provided with a bottom plate 10 attached to a pair of mounting screws 11, one at either end thereof, upon which are positioned a pair of mounting studs 12. The bottom plate 10 is provided with a centrally disposed opening 13 for accommodating the end of the shaft of the spring and clutch assembly to be tested generally indicated at 14 in the drawings. As will be understood from the description included hereinafter regarding Fig. 6 of the drawings, when the torque meter is used to test or calibrate spring and clutch devices mounted within the clock device itself, the mounting studs 12 and the bottom plate 10, as well as the mounting screws 11, are not required since the bottom plate 10 corresponds with the clock spring and clutch assembly shaft supporting device in the clock and the mounting studs 12 correspond to suitable mounting studs in the clock which function in the same manner as mounting studs 12. Consequently the members 10, 11 and 12 described thus far, together with the device comprising the clock spring and clutch assembly 14 to be tested are not part of the torque meter generally indicated at 15 in the drawings in the broadest sense. Actually the members 10, 11 and 12 are auxiliary devices to be attached to the torque meter 15 when the torque meter is used to calibrate devices such as 14 disassociated from the clock device in which they are normally incorporated. Of course when the testing device 15 is used to test and calibrate the clock spring and clutch assemblies during the manufacturing operation for example, then members 10, 11 and 12 described thus far become an essential part of the torque meter of the present invention, an important feature of the present invention being the fact that the torque meter may be used to calibrate clutch devices of the clock spring assemblies irrespective of whether they are mounted within the clock device per se or are disassociated therefrom.

In accordance with the present invention, the torque meter 15 includes a main plate 17 with a somewhat semicircular configuration as best shown in Figs. 2, 3 and 4 of the drawings, upon which suitable indicia such as is indicated at 18 may be provided. This indicia has been indicated as a calibration scale specifically calibrated in ounce-inches which are the units that the torque applied to the clock spring and clutch assembly would be measured in. A pair of knurled thumb screws 19 are provided to support the main plate 17 from the studs 12 in a manner permitting ready assembly and disassembly which will be clearly understood by reference to the drawings.

It will be apparent that any suitable means in the form of a pointer or the like may be employed to cooperate with the scale 18 on the plate 17. As illustrated in the drawings, there is provided a bracket member 20 having a U-shaped configuration, best shown in Fig. 5 of the drawings. One leg of the U-shaped member 20 is slightly longer than the other and terminates in a pointed extension 20a defining a pointer adapted to move across the arcuate scale 18. The bracket 20 is pivotally supported from the main plate 17 by means of a center stud 21 which extends through an opening 22 in the main plate 17 and is fastened thereto by any suitable means such as welding or the like. The end of the center stud 21 adjacent plate 17 is provided with a shaft receiving recess 23, the purpose of which will become apparent as the following description proceeds. The other end of the center stud 21 is provided with a portion of reduced cross-section 21a which extends through an opening in one leg of the U-shaped bracket 20. An opening 20b is provided in the other leg of the U-shaped bracket 20 through which the center stud 21 is adapted to extend. A spacer rod 25 is provided between the ends of the U-shaped bracket 20 and may be fastened thereto by riveting or the like. A suitable spacer bushing 26 is adapted to be positioned between the legs of the U-shaped bracket 20 adjacent the bight end of the U and the means for holding the spacer bushing 26 in this position will be described hereinafter.

To support a suitable calibrated energy storage device there is positioned about the center stud 21 an annular spring arbor 27 having a portion of reduced cross-section 28 for accommodating the calibrated spring 29. The calibrated spring 29 is adapted to have one end thereof fastened to the spring arbor 27 which in turn is rigidly related to the center stud 21 fastened to the main plate 17. Preferably spring 29 is a flat coil spring having the other end thereof fastened to the bracket member 20. As illustrated in the drawings, the other end of the spring 29 is fastened to the spacer rod 25 as indicated at 30. With this arrangement, the spring 29 exerts a force on the spacer rod 25 so as to tend to rotate the pointer portion 20a of the U-shaped bracket 20 to the position shown in Fig. 2 of the drawings which is the zero torque position of the torque meter 15. To prevent the spring 29 from moving the pointer 20a in a direction to the negative side of zero a suitable stop means may be provided. As illustrated, suitable notches 31 and 32 are provided in the leg of the U-shaped bracket 20 having the extension 20a. These cutout portions are adapted to engage with the knurled thumb screws 19 to limit the extreme movements of the pointer 20a. As illustrated in Fig. 4 of the drawings, the cutout portion 32 is in engagement with the thumb screw 19 on the right-hand side of plate 17, thus limiting the pointer 20a to the zero point of the scale.

For the purpose of applying a torque to the clock spring and clutch mechanism 14 to calibrate the same, there is provided a hand wheel 33 fastened to a suitable shaft 34 as by means of a set screw 35. The shaft 34 is adapted to extend through aligned openings provided near the bight end of the U-shaped bracket 20. The spacer bushing 26 referred to above disposed between the legs of the U-shaped bracket 20 is fastened to the shaft 34 by means of a set screw 36, thereby positioning the shaft 34 relative to the bracket 20 for rotatable movement relative thereto. The end of the shaft 34 remote from the hand wheel 33 is provided with a pinion 37, the purpose of which will become apparent as the following description proceeds.

In order to insure that the torque produced by means of operating the hand wheel 33, which torque is supplied to the clock spring and clutch assembly 14, is not released whenever the operator stops applying force to the hand wheel 33, there is provided a ratchet mechanism comprising a ratchet wheel 40 suitably fastened as by brazing or soldering to the bushing 33a associated with the hand wheel 33. Cooperating with the ratchet 40 is a ratchet stop arm 41 best shown in Figs. 2, 3 and 5 of the drawings. This ratchet stop arm 41 is of somewhat L-shaped configuration and is pivotally mounted to the center stud 21 by means of a center stud screw 42 having a portion of enlarged cross-section 42a. In addition, the ratchet arm 41 is provided with a somewhat elliptical opening 44 surrounding the shaft 34 and concentric with the ratchet wheel 40. A tooth 45 best shown in Figs. 2 and 3 integrally formed with the ratchet stop arm 41 is adapted to engage with the ratchet wheel 40, thereby maintaining the torque applied to the shaft 34 by the hand wheel 33, even though the operator should release the hand wheel 33. The other arm of the L-shaped ratchet stop arm 41 is provided with a laterally projecting portion 41a supporting a ratchet stop spring 46 the free end of which engages the bight of the U-shaped bracket 20 so as to bias the tooth 45 into engagement with the ratchet wheel 40. The laterally projecting portion 41a of the L-shaped ratchet stop arm 41 is engageable by the operator's thumb to release the torque applied to the device being calibrated such as 14. Upon completion of the calibration when a force is applied to the member 41a, the ratchet stop arm 41 is caused to pivot in a counterclockwise direction about member 42a of center stud screw 42 as viewed in Fig. 3 of the drawings, thereby causing the tooth 45 to release the ratchet wheel 40 whereupon the energy stored in calibrated spring 29 is released and the bracket 20 with the associated pointer portion 20a is returned to the zero position shown in Fig. 2 of the drawings.

In order to understand the operation of the torque meter described thus far, a somewhat better understanding of the clock spring and clutch device 14 might be desirable. Actually, such clock spring and clutch devices generally comprise a spring barrel or housing 50 within which is mounted a coiled flat strip clock spring not shown in the drawings. One end of the spring is fastened to the housing or drum 50, while the other end is fastened to a suitable shaft 51 of the assembly. The clock spring mechanism 14 also includes a pair of gears 52 and 53 associated with the shaft 51 and a friction clutch mechanism generally indicated at 54, the friction of which may be controlled by the pressure applied to a suitable spring device 55. The gear 52 is adapted to be engaged with a suitable winding mechanism, not shown, of the type referred to above for winding the clock spring upon power restoration following a power failure, whereby rotation of this gear 52 drives the drum 50 through the friction clutch 54. Since the shaft 51 is relatively stationary under these conditions, the gear 53 being meshed with a suitable driven mechanism, the clock spring is effectively wound by rotating the drum 50 while holding the other end of the clock spring, not shown, fastened to the shaft 51 stationary. When the spring is completely wound the winding mechanism, not shown, meshed with the gear 52 will continue to rotate the gear 52 and it is at this time that the friction clutch 54 comes into play permitting gear 52 to continue to rotate while clutch slippage occurs so that the drum 50 and other associated parts remain stationary. The torque meter 15 of the present invention, as will become apparent from the following description, is actually employed for two different purposes. It is used to test the torque at which slippage of the friction clutch 54 occurs without reference to the associated clock spring, and it also is used to calibrate the clock spring itself without reference to the clutch.

For the purpose of calibrating the clock spring within the drum 50 to determine whether it provides sufficient torque to produce a predetermined running time of the mechanism, means must be provided for holding the shaft 51 stationary during this testing operation. It will be apparent that when the clutch and spring assemblies are mounted in the clock mechanism that the gear 53 and consequently the shaft 51 would effectively be held in a stationary position by driven means meshing with the gear 53. However, in accordance with the present invention, for use when the clock spring assemblies are tested disassociated from the clock unit, there is provided a pinion 56 which is firmly fastened as by riveting, brazing or welding to the bottom plate 10 as is clearly indicated in Fig. 1 of the drawings. This gear is positioned so as to mesh with the gear 53 of the spring and clutch mechanism and will hold the gear 53 stationary. With the torque meter 15 of the present invention applied to the spring and clutch assembly or mechanism 14 as indicated in Fig. 1 of the drawings hand wheel 33 may be rotated causing gear 52 which is meshed with pinion 37 to rotate and through friction clutch 54 drive the drum 50 to which one end of the clock spring, not shown, is fastened. Since the shaft 51 to which the other end of the clock spring is fastened is held stationary by virtue of the pinion 56 acting through the gear 53 the clock spring will be wound in any desired manner and the torque thereof balanced against that of the calibrated spring 29 so as to provide a torque reading on the scale 18 provided on the plate 17. If the spring in a predetermined wound condition does not produce sufficient torque, it is discarded and in this way a satisfactory selection of clock springs can be obtained. Preferably the clock spring is wound exactly one turn and the torque read and then is fully wound and the torque read again. In these tests the drum 50 is free to rotate.

In order to carry out the other function of the torque meter 15 of the present invention, i. e., calibrating the clutch 54, there is provided a latch lever 57 pivotally mounted on one of the screws 19. This latch lever 57 is adapted to engage a cooperating opening such as 58 provided in the barrel or drum 50 of the clock spring and clutch mechanism 14. When the device 14 to be tested or calibrated and the torque meter 15 are related in the manner indicated in Fig. 1 of the drawings to calibrate the clutch 54 the latch lever 57 is pivoted so that a projection 57a thereof extends into the notch or recess 58 in the barrel 50, thereby preventing rotation of the barrel or drum 50 so that if a torque is applied through hand wheel 33 to rotate the gear 52 with the drum 50 stationary the clutch 54 will have to slip. When the latch 57 engages the opening 58 in the drum or barrel 50, and a torque is applied through the hand wheel 33 to the gear 52 through the pinion 37, slippage of the clutch 54 must occur. The torque applied to cause such slippage is also applied to the calibrated spring 29. Effectively therefore the torque applied to the clutch 54 to cause slippage thereof is compared with an equal but opposing torque applied to the calibrated spring 29. The torque at which slippage of the clutch occurs may therefore be read on the scale or indicia 18. It will be understood that the clutch 55 should have a reasonably uniform torque characteristic throughout 360 degrees of slippage with respect to the other driven members with which it is frictionally related. By means of the torque meter the clutch assembly member is rotated through a number of revolutions and the torque is noted at numerous points throughout one complete revolution thereof. It is evident that if a serious drop in torque is encountered at any point throughout the 360 degrees of rotation the clock spring in normal operation will be wound to a degree which is limited to the point of lowest torque and consequently the clock operation will be affected accordingly. It will be understood of course that when the clock spring not shown is calibrated in the manner described in the preceding paragraph that the latch 57 is pivoted so as to be free of the opening 58 in the drum 50 to permit rotation of the drum and winding of the clock spring to be calibrated. It will be understood that the spring 55 applying pressure to the friction clutch 54 may be adjusted by means of adjusting screws 60 to obtain the proper torque at which slippage occurs. When the proper adjustment of the clutch 54 is obtained ratchet stop arm 41 is operated to release the torque.

In Fig. 6 of the drawings, the torque meter 15 is illustrated as applied to a clock mechanism 61 having mounted therein the clutch and clock spring mechanism 14 identical with that described in connection with Fig. 1 of the drawings. However, in the clock mechanism 61 the shaft 51 of the device or mechanism 14 is pivotally supported in a supporting means 62 in the clock, while the other end of the shaft 51 is pivotally supported by a removable cover plate 63. Suitable studs 64 and 65 support the plate 63 in the desired manner. It will be understood that suitable means must be provided so that upon inserting the torque meter 15 into the clock mechanism 61 as shown in Fig. 6 of the drawings, the winding mechanism, not shown, is disengaged with respect to the gear 52. The function of the pinion 56 described above will be taken care of by the driven mechanism meshing with the gear 53. In this manner the torque meter 15 may be employed to perform both functions thereof as described above when associated with the clock 61.

From the above discussion, it will be apparent that there has been provided a very simple and compact torque meter which can be used to calibrate the clutch and clock spring assemblies of clock devices whether the devices to be calibrated are mounted within the clock unit or whether they are separate therefrom.

It will be apparent to those skilled in the art that the present invention is not limited to the particular construction shown but that changes and modifications may be made without departing from the spirit and scope of the present invention and it is aimed in the appended claims to cover all such changes and modifications.

What is claimed as new and desired to be secured by Letters Patent of the United States is:

1. A torque meter comprising a stationary main supporting plate, a bracket, a center stud fixed to said plate pivotally relating said bracket to said plate, a calibrated energy storage device disposed on said stud having one portion fixed relative to said stud, means for attaching another portion of said device to said bracket so that movement of said bracket relative to said plate tends to occur in dependence upon the energy stored in said device, means connected to said bracket for supplying a torque to an associated element, means for transmitting a force representative of said torque from said associated element to said bracket to cause relative movement between said bracket and said plate thereby storing energy in said device, and means for indicating the magnitude of the torque applied to said bracket.

2. A torque meter comprising a stationary main supporting plate, a bracket, a stationary center stud pivotally relating said bracket to said plate, a spring arbor on said stud, a calibrated spring wound on said arbor and having one end fastened thereto, means for fastening the other end of said spring to said bracket so that movement of said bracket relative to said plate tends to occur in dependence upon the energy stored in said spring, means including a rotatable shaft extending through said bracket at a predetermined distance from said stud for applying a rotative force to an associated device, means for transmitting a force representative of said rotative force to said bracket to cause relative movement between said bracket and said plate thereby storing energy in said spring, and means including cooperating elements on said plate and said bracket for indicating the magnitude of the torque applied to said bracket.

3. A torque meter comprising a main supporting plate, a U-shaped bracket one leg of which defines a pointer, a center stud fixed to said plate pivotally relating said bracket to said plate, a spring arbor on said stud, a calibrated spring wound on said arbor and having one end fastened thereto, means for fastening the other end of said spring to said bracket so that movement of said bracket relative to said plate tends to occur in dependence upon the energy stored in said spring, a rotatable shaft extending through said bracket adjacent the bight end thereof for supplying a torque to an associated device, means for transmitting a force representative of said torque from said associated device to said bracket to cause relative movement between said bracket and said plate thereby storing energy in said spring, and means including said pointer for indicating the magnitude of the torque applied to said device.

4. A torque meter comprising a main supporting plate, a U-shaped bracket one leg of which defines a pointer, a center stud pivotally connecting an intermediate point on said bracket to said plate, a spring arbor on said stud fixedly mounted relative to said plate, a calibrated spring wound on said arbor and having one end fastened thereto, means for fastening the other end of said spring to said bracket at the end adjacent said pointer so that movement of said bracket relative to said plate tends to occur in dependence upon the energy stored in said spring, means for applying a rotative force to said bracket at the other end thereof to cause relative movement between said bracket and said plate thereby storing energy in said spring, and means including indicia on said plate cooperating with said pointer for indicating the magnitude of the torque applied to said bracket.

5. A torque meter comprising a main supporting plate, a bracket, a center stud fixed to said plate pivotally relating said bracket to said plate, a spring arbor on said stud, a calibrated spring wound on said arbor and having one end fastened thereto, means for fastening the other end of said spring to said bracket so that movement of said bracket relative to said plate tends to occur in dependence upon the energy stored in said spring, means connected to said bracket for supplying a torque to an associated device, means for transmitting a force representative of said torque from said associated device to said bracket to cause relative movement between said bracket and said plate thereby storing energy in said spring, releasable means effective to prevent the release of energy stored in said spring, and means for indicating the magnitude of the torque applied to said bracket during the time said releasable means is effective.

6. A torque meter comprising a main supporting plate, a U-shaped bracket one leg of which defines a pointer, a center stud fixed to said plate pivotally relating said bracket to said plate, a spring arbor on said stud, a calibrated spring wound on said arbor and having one end fastened to the pointer end of said bracket, means for fastening the other end of said spring to said bracket so that movement of said bracket relative to said plate tends to occur in dependence upon the energy stored in said spring, a rotatable shaft extending through said bracket adjacent the bight end thereof for supplying a torque to an associated device, means for transmitting a force representative of said torque from said associated device to said bracket to cause relative movement between said bracket and said plate thereby storing energy in said spring, and releasable means effective to prevent the release of the energy stored in said spring including a ratchet associated with said shaft.

7. A torque meter adapted for use in calibrating a clutch and clock spring assembly, whether a part of or separate from the clock, comprising means for relating said torque meter to said assembly in a manner so a predetermined torque may be applied thereto, pivotal means on said meter positioned so as to engage with said clock spring assembly to hold one portion of said assembly in a fixed position when said first mentioned means is rendered effective, rotatable means including a hand wheel on said torque meter for applying a torque to said assembly to cause slippage of said clutch, means including a bracket pivoted on said meter including a pointer portion, calibrated energy storage means on said meter, means for operatively connecting said bracket and said calibrated means so that movement of said bracket changes the quantity of energy stored in said calibrated means, said rotatable means including means for applying a rotative force to said bracket when applying a torque to said clutch and clock spring assembly thereby storing energy in said calibrated means to an extent equivalent to the torque applied by said rotatable means, means limiting the movement in each direction of said bracket, and a scale associated with said pointer for indicating the torque applied by said rotatable means.

FRED KRAHULEC.

REFERENCES CITED

The following references are of record in the file of this patent:

UNITED STATES PATENTS

| Number | Name | Date |
| --- | --- | --- |
| 1,120,838 | Miller | Dec. 15, 1914 |
| 1,881,756 | Long | Oct. 11, 1932 |
| 2,113,550 | Nieman | Apr. 5, 1938 |
| 2,133,763 | Williams | Oct. 18, 1938 |
| 2,182,519 | Handy | Dec. 5, 1939 |
| 2,384,520 | Aller | Sept. 11, 1945 |
| 2,441,608 | Warner | May 18, 1948 |